United States Patent [19]

Long

[11] Patent Number: 5,495,649
[45] Date of Patent: Mar. 5, 1996

[54] TOOL FOR SEPARATING A PAIR OF OPPOSITELY DISPOSED SPOT-WELDED SHEET METAL PANELS

[76] Inventor: James A. Long, 1741 Jim Long Rd., Hillsboro, Tenn. 37342

[21] Appl. No.: 311,584

[22] Filed: Sep. 23, 1994

Related U.S. Application Data

[62] Division of Ser. No. 159,161, Nov. 30, 1993, Pat. No. 5,349,737.

[51] Int. Cl.[6] .............................. B25B 27/14; B26F 1/00
[52] U.S. Cl. ................................. 29/275; 30/358
[58] Field of Search .................... 29/275, 270, 426.5, 29/426.4; 30/277, 362, 358, 360, 361, 366; 81/463

[56] References Cited

U.S. PATENT DOCUMENTS

| | | | |
|---|---|---|---|
| 91,400 | 6/1869 | Wright | 30/358 |
| 2,409,589 | 10/1946 | Rocheville | 30/358 |
| 2,853,723 | 9/1958 | Winslow | 29/426.4 |
| 2,961,907 | 11/1960 | Hohlbein | 29/426.4 X |
| 4,107,842 | 8/1978 | MacKeigan | 29/233 |
| 4,587,737 | 5/1986 | Wilson | 30/358 |
| 4,644,656 | 2/1987 | Chouinard | 30/362 |
| 5,001,822 | 3/1991 | Upthegrove | 29/275 |

*Primary Examiner*—William Briggs
*Attorney, Agent, or Firm*—Wigman, Cohen, Leitner & Myers

[57] ABSTRACT

In a process for separating overlapping sheet metal panels, which are welded together by a series of spot-welds, the portion of each spot-weld in one of the panels is removed by drilling or milling after which pressure is applied by means of a tool, driven by a pneumatic hammer device, to the remaining portion of the spot-weld in the other panel forcing the other panel away from the one panel and separating of the panels without substantial damage to the panels. Alternatively, a hole saw may be used to separate the spot-weld from the one panel before pressure is applied to the spot-weld to separate the panels.

3 Claims, 2 Drawing Sheets

TOOL FOR SEPARATING A PAIR OF OPPOSITELY DISPOSED SPOT-WELDED SHEET METAL PANELS

This is a divisional of application Ser. No. 08/159,161, filed on Nov. 30, 1993, now U.S. Pat. No. 5,349,737.

BACKGROUND OF THE INVENTION

Field of the Invention

This invention is directed to a method and apparatus for separating overlapped sheet metal panels, which have been spot-welded together, with a minimum of damage and distortion to the panels, thus permitting any one or all of the panels to be reused.

The majority of truck cabs and bodies and greater than 95% of all automobiles sold in the United States since the late 1980's utilize the unibody construction. The unibody is assembled from stamped or formed sheet metal panels which are spot-welded or resistance-welded together in overlapping relationship. The spot-weld or resistance-weld is formed by a controlled electrical current applied to two or more metal panels while the panels are pressed together, resulting in a small circular area or spot of the contiguous panels being bonded together. The diameter of the spot and the quality of the weld will be influenced by changes in the electric current, the nature of the sheet metal panels, the amount of pressure applied to the overlapping panels, etc.

The unibody construction utilizing a plurality of spot or resistance-welds between overlapping sheet metal panels is ideal from a manufacturing standpoint. However, repair of a damaged unibody vehicle can be labor intensive particularly when one or more damaged sheet metal panels must be replaced. Correct panel replacement can become very time consuming. The approved method of repair requires that all damaged spot-welded panels be removed and replaced with new panels spot-welded to the original undamaged sheet metal panels in the original factory relationship.

Spot-welded panel separation requires the removal from at least one of the panels of the series of spot-welds bonding the overlapping panels together. Due to numerous problems, however, the panels frequently remain attached after the spot-welds have been removed. For example, each spot-weld is commonly removed by drilling or milling through the overlapping sheet metal panels at each spot-weld location. However, if the drill bit or mill is slightly off-center with respect to a spot-weld, a thin line on one side of the spot-weld will remain, continuing to secure the overlapping sheet metal panels and preventing their separation. If a drill bit or mill is used which has a diameter smaller than the diameter of the spot-weld, a thin circular line of the spot-weld remains, preventing separation of the overlapping sheet metal panels. Occasionally, there is a pattern of smaller welds called spot-weld spatter surrounding a spot-weld, resulting in the overlapping sheet metal panels remaining welded together even after the spot-weld has been fully removed.

Also, sealer or adhesive between the panels applied to restrict water or air flow between the panels and paint or primer between the panels applied to restrict rust or corrosion act as an adhesive, bonding the overlapping sheet metal panels in areas surrounding the spot-welds. The overlapping sheet metal panels remain bonded together by the sealer, adhesive, paint or primer even after the spot-welds have been removed.

Separating the overlapping panels which continue to be bonded together due to the incomplete removal of the spot-weld, the spot-weld spatter between the panels and/or the bonding by the sealer, adhesive, paint or primer, requires excessive force frequently resulting in damage not only to the panel being replaced but to the other panel or panels adjoining this panel. Moreover, the time required to separate these overlapping panels and at the same time minimize damage to the panels is substantial.

An object of the present invention is to provide a method and apparatus for separating overlapping spot-welded sheet metal panels in substantially less time while minimizing damage and distortion to the panels.

A further object of the present invention is to minimize the damage to the overlapping spot-welded sheet metal panels while being separated and, at the same time, drastically reduce total panel replacement time compared with prior art methods.

SUMMARY OF THE INVENTION

These and other objects of the present invention are accomplished by separating each spot-weld from one of the two overlapping panels and then applying pressure or a pulsing vibration to the spot-weld, which is integral with one of the panels, to force the panels apart. Damage and distortion to the panels are minimized due to the fact that the spot-weld is substantially harder than the surrounding metal of the panel and consequently resists distortion and damage when pressure is applied to separate the panels.

DESCRIPTION OF THE PREFERRED EMBODIMENT

Figure 1:
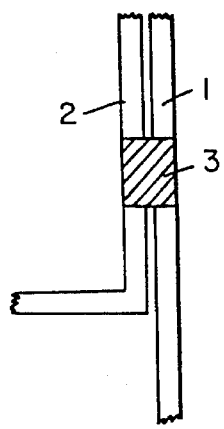
FIG. 1 is a schematic diagram of portions of overlapping sheet metal panels secured together by a resistance-weld or spot-weld.
Figure 2:
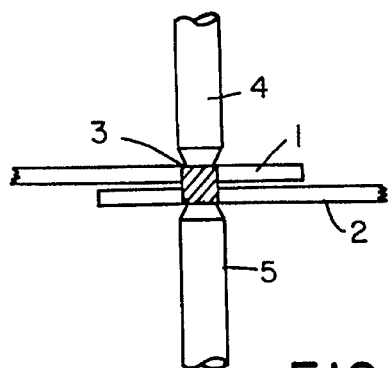
FIG. 2 is a schematic diagram of the overlapping sheet metal panels being spot-welded together.

Overlapping sheet metal panels are normally secured together by a row or series or spaced spot-welds. FIG. 1 is a schematic diagram of two sheet metal panels 1, 2 in overlapping relationship held in position by a resistance-weld or spot-weld 3. FIG. 2 shows diagrammatically how overlapping sheet metal panels are spot-welded together. Pressure is applied to retain the overlapping sheet metal panels in contiguous relationship with electrodes 4, 5 applied at opposite sides thereof. A high electrical potential applied between the electrodes causes heat to be generated by the electrical resistance of the metal in the panels resulting in a substantially circular spot-weld 3 securing the panels together.

Figure 3:
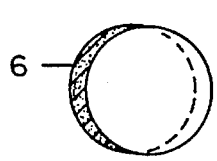
FIGS. 3, 4 and 5 show diagrammatically various situations which create problems with prior art methods for separating overlapping spot-welded sheet metal panels.
Figure 4:
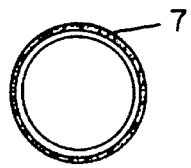
Figure 5:
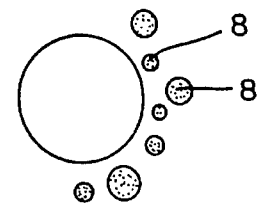
Figure 6:
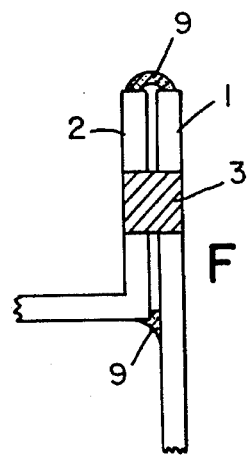
FIG. 6 is a schematic diagram of overlapping spot-welded sheet metal panels with sealer to restrict water or air flow between the panels.
Figure 7:
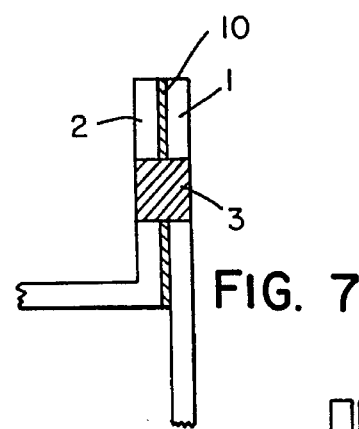
FIG. 7 is a schematic diagram of overlapping spot-welded sheet metal panels with paint or primer between the panels to restrict rust or corrosion.

To replace a damaged sheet metal panel which is secured by a series of spot-welds to a partially overlapping second panel it has been common practice to remove each of the spot-welds by drilling or milling through at least one of the overlapping sheet metal panels at each spot-weld location using a drill bit or mill of predetermined diameter. FIGS. 3, 4 and 5 illustrate diagrammatically the problems with this prior art method of separating overlapping spot-welded sheet metal panels. If the drill bit or mill is slightly off-center with respect to the spot-weld, a thin line 6 on one side of the spot-weld will remain. This thin line of remaining spot-weld will continue to secure the overlapping sheet metal panels and prevent their separation. If the drill bit or mill has a diameter smaller than the diameter of the spot-weld, a thin circular line 7 of the spot-weld remains. This thin circular spot-weld line will also prevent separation of the overlapping sheet metal panels. Even if the entire spot-weld is removed by the drill bit or mill, occasionally a pattern of smaller welds called "spot-weld spatter" 8 surrounding a spot-weld will continue to retain the sheet metal panels in contiguous relationship preventing their separation.

Even in those instances where the spot-welds are fully removed by the drill bits or mills and there is no spot-weld spatter surrounding the spot-welds, frequently the overlapping sheet metal panels will continue to be bonded together by sealer or adhesive 9 applied along the edges of the overlapping areas to restrict water or air flow between the panels or by paint or primer 10 located between the overlapping panels to restrict rust or corrosion. The sealer, adhesive paint or primer firmly bonds the overlapping sheet metal panels together even in the absence of the spot-welds.

Separating the overlapping panels which are bonded together due to incomplete removal of the spot-weld, due to the spot-weld spatter between the panels and/or due to the bonding caused by the sealer adhesive paint or primer requires excessive force, frequently resulting in distortion and damage, not only to the panel being replaced but to the other panel or panels to which this panel has been spot-welded. Moreover, irrespective of whether the panels are distorted or damaged during separation, considerable time is required to separate the overlapping panels, substantially increasing the cost of repairs. It has been common practice to drive wedges between the panels, after removing the spot-welds, at locations spaced from the spot-welds to force the panels apart. This takes considerable time and results in distortion and damage which must be corrected before the replacement panel can be spot-welded in place.

Figure 10:
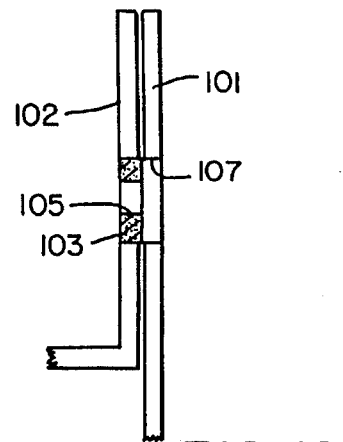
FIG. 10 is a schematic diagram of the overlapping sheet metal panels upon completion of the first and second steps shown in FIGS. 8 and 9.
Figure 11:
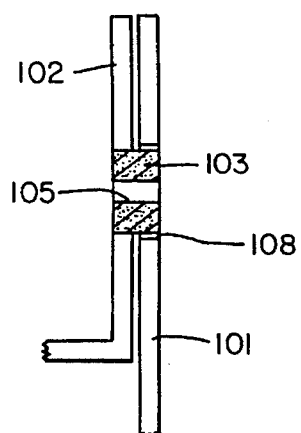
FIG. 11 is a schematic diagram of an alternative second step of the process for separating overlapping spot-welded sheet metal panels of FIG. 8.
Figure 12:
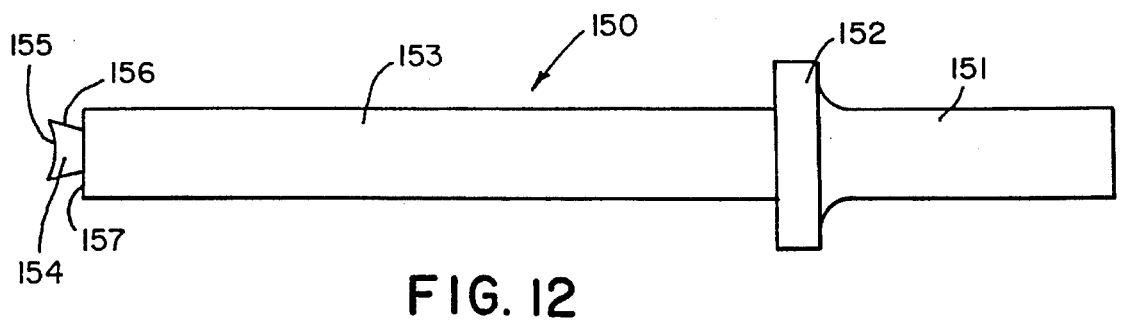
FIG. 12 is a side view of the cylindrical panel separator of the present invention.

In accordance with the present invention the spot-welded overlapping sheet metal panels are separated with very minimal or no damage to the panels by a series of steps illustrated diagrammatically in FIGS. 8–14 preferably utilizing a specially designed panel separator tool, shown in FIG. 12, with a common automotive-type pneumatic hammer.

Figure 8:
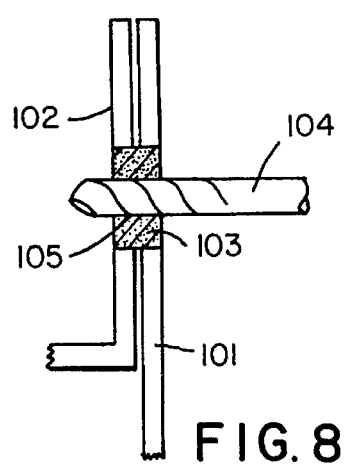
FIG. 8 is a schematic diagram of the first step of a method for separating the overlapping spot-welded sheet metal panels of FIG. 1.

FIG. 8 shows, schematically, portions of overlapping sheet metal panels 101, 102 and one of the series of spot-welds 103 securing the panels together. The spot-weld creates a dense cylindrical plug 103 extending through both the front panel 101 and the rear panel 102. This plug 103 is denser and harder than the surrounding metal, a physical characteristic which is advantageously utilized in the process of separating the panels.

Preferably, a pilot hole 105 is drilled through the overlapping panels 101, 102 at each spot-weld 103 using a drill bit 104 as shown schematically in FIG. 8. The diameter of the pilot hole 105 is substantially smaller than the diameter of the spot-weld or plug 103. It should be understood, however, that the pilot hole, though desirable, is not essential in the panel separation process of the present invention.

A spot cutter 106, which may be either a drill-type or hole saw-type spot cutter, is then used to make a circular cut or a hole, larger than the pilot hole 105, through only the front panel 101.

Figure 9:
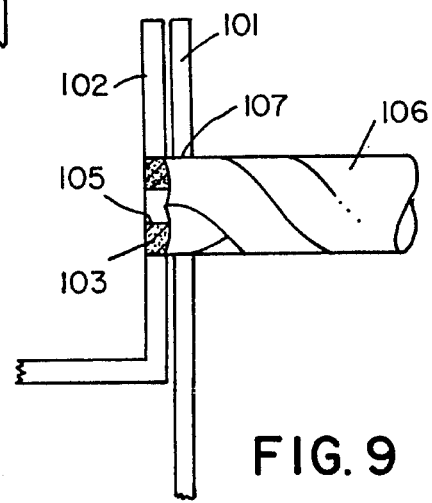
FIG. 9 illustrates the second step of the method for separating overlapping spot-welded sheet metal panels of FIG. 8.

Utilizing a drill-type spot cutter, a hole 107 is bored through only the front panel 101 as shown in FIG. 9, the spot-weld or plug 103 in the rear panel 102 remaining in place. The diameter of the drill-type spot cutter is determined by the spot-weld diameter. The diameter of the larger hole 107 should be substantially the same as, or slightly larger than, the diameter of the spot-weld or plug 103. At this point, the rear panel 102 has a small pilot hole 105 passing through the center of the hardened plug 103; and the front panel 101 has a larger hole 107, as shown in FIG. 10.

If a hole saw-type spot cutter is used, a circular cut 108, larger than the pilot hole 105, is made through only the front panel 101 as shown in FIG. 11. The plug 103 remains in place in the rear panel 102 but severed by the circular cut from the front panel 101. The diameter of the circular cut is substantially the same as, or slightly larger than, the diameter of the spot-weld or plug 103. A disadvantage of using a hole saw-type spot cutter is that, after the panels are separated, the projecting portion of the plug 103 on the rear panel 102 must be ground down to be flush with the surface of the rear panel before the replacement front panel can be spot-welded to the rear panel.

Figure 13:
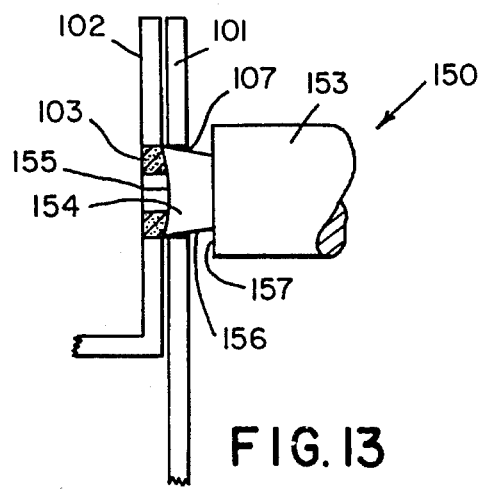
FIG. 13 is a schematic diagram of portions of the overlapping panels of FIG. 10 with the panel separator, shown in FIG. 12, positioned for the final step in the separation of the panels.
Figure 14:
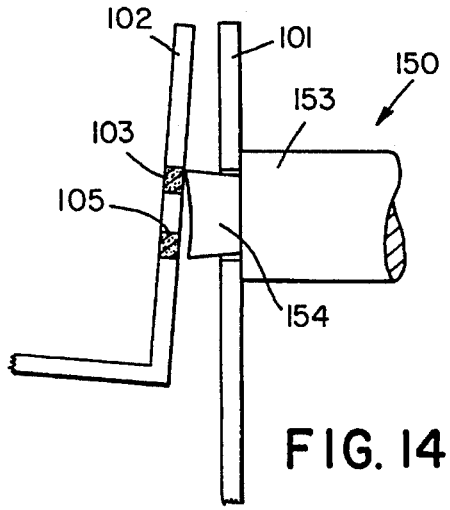
FIG. 14 is a schematic diagram of portions of the overlapping panels of FIG. 13 following separation by the panel separator.

A specially designed panel separator tool mounted in an automotive-type pneumatic hammer device is preferred to separate the panels 101, 102 as shown in FIGS. 13 and 14. The panel separator tool 150, shown in its entirety in FIG. 12, has an elongated cylindrical configuration, the base end 151 of which is designed to be retained in the chuck of the pneumatic hammer device (not shown). A collar 152 separates the base end 151 from the cylindrical barrel 153. At the free end of the cylindrical barrel 153 is a cylindrical axially projecting member 154, the diameter of which is smaller than the diameter of the barrel. The end 155 of the projecting member preferably has a slightly concave configuration and the side 156 of the projecting member may be slightly tapered thus having a conical configuration. The free end of the barrel 153 provides a shoulder 157 which is wider than the projecting member 154.

Referring to FIG. 13, it will be noted that the projecting member 154 has a maximum diameter which may be the same as or slightly less than the diameter of the larger hole 107 in the front panel 101 and has a minimum length which is greater than the thickness of the front panel 101. The projecting member 154 is inserted in the larger hole 107 such that the concave end 155 thereof abuts the hardened plug 103. The projecting member 154 is tapered inwardly towards the shoulder 157, as pointed out earlier, to minimize friction between the projecting member 104 and the walls of the larger hole 107 in the front panel 101. The end 155 of the projecting member 154 is slightly concave as mentioned earlier to minimize damage and distortion of the rear panel 103.

The pneumatic hammer device, in which the panel separator tool 150 is mounted, is of a type commonly used for automobile body repairs and has an adjustable chuck for receiving the tool. Pneumatic hammer devices of this type generally have a hammer or vibration rate of between 1500 and 4500 blows per minute. A pressure regulator is required to control the pressure of the compressed air fed to the pneumatic hammer device which should be carefully controlled to avoid excessively strong blows which will damage the metal panels. Mack Tools, Inc. of Washington Court House, Ohio markets a suitable pneumatic hammer device, Mack AH600, which has a hammer rate of 2100 per minute. Depending upon the thickness of the metal panels, the air pressure fed to the Mack AH600 normally ranges between about 40 and 45 psi.

When the pneumatic hammer device, in which the panel separator tool 150 is mounted, is activated, the axial pulsating hammering of the panel separator tool applies pressure to the side of the hardened plug 103 breaking the bond between the sheet metal panels and causing the rear panel 102 to separate from the front panel 101 as shown in FIG. 14. The shoulder 157 at the end of the barrel 153 will then abut the front side of the front panel 101 limiting movement of the panel separator tool through the larger hole 107 in the front panel 101.

The dimensions of the panel separator tool 150 will of course depend on the thickness of the front panel and the diameter of the hole in the front panel. A specific example of the dimensions of a panel separator tool 150 for use in separating two sheet metal panels, wherein the thickness of the front panel 101 is about 1/16 inch, the diameter of the pilot hole in the hardened plug 103 of the rear panel 102 is 1/8 inch and the diameter of the hole in the front panel 101 is 1/4 inch, is as follows:

| | |
|---|---|
| Diameter of barrel 153 | 0.479" |
| Length of projecting member 154 from shoulder 157 | 0.175" |
| Diameter of projecting member 154 at free end | 0.229" |
| Diameter of projecting member 154 at shoulder 157 | 0.209" |
| Distance of a plane passing through center of concave surface and a plane passing through opposite outer edges of the concave surface at the free end 155 of the projecting member 154 | 0.012" |

As stated above, it is preferred to use the above-described panel separator tool mounted in a pneumatic hammer device to separate the panels. Alternatively, however, the panel separator tool could be used with a hammer, or a common punch and hammer could be used in the above-described process to apply pressure to the plug 103 and separate the panels. However, there is substantially greater risk of damage to the panels when using punch rather than the panel separator tool.

By utilizing the above-described process for separating the spot-welded sheet metal panels with the specially designed panel separator tool, damage to either of the panels is limited primarily to the holes drilled in the panels, and there is little if any distortion of either of the panels. This is due largely to the fact that, unlike prior art methods for separating spot-welded panels, wherein a hole approximately the same diameter as the spot-weld is drilled through at least the front panel and the panels are pried apart by driving a wedge between the panels at one or more locations spaced from the spot-welds, in accordance with the present invention the portion of the spot-weld in the rear panel is preserved as a hardened plug which receives most of the force applied to the panels by the panel separating tool at the time the panels are separated. The rear panel is unlikely to be distorted or bent when pressure is applied by the separator tool due to the reinforcing nature of the hardened plug.

A further advantage of the above-described process is the reduction in time required to separate panels compared with prior art processes. The panels may be separated easily and cleanly, minimizing distortion or bent panels. When a new panel is to replace one of the separated panels, it is a simple matter to spot-weld the new panel in place of the removed one.

While the preferred embodiments of the invention have been illustrated and described, it should be understood that variations will be apparent to one skilled in the art. Accordingly, the invention is not to be limited to the specific embodiments shown and described.

I claim:

1. A tool for applying pressure between a pair of oppositely disposed spot-welded sheet metal panels for separating the panels, comprising:

a base;

a cylindrical portion extending from the base and, said cylindrical portion having a front end and a rear end and having a portion at its rear end to be received by an actuating device;

a projecting member mounted at the front end of said cylindrical portion so to contact a hole in a first spot-welded sheet metal panel, said projecting member having a top portion having a concave profile and side portions having a conical profile;

said cylindrical portion having a shoulder at its front end for limiting movement of said projecting member through the panel and having larger cross-sectional width than the diameter of said projecting member, said shoulder providing sole support for said projecting member and providing no obstruction of access of said projecting member to said panels;

said projecting member having a minimum length which is selected to be greater than the thickness of said first sheet metal panel, so that when a pulsating movement is applied to said hole in said first sheet metal panel the second sheet metal panel with a remaining spot-weld is separated from said first sheet panel.

2. A tool as in claim 1, wherein said projecting member has a diameter less than or equal to the diameter of said hole in said first sheet metal panel.

3. A tool in claim 1, wherein the tool projecting member diameter is selected to engage a hole, wherein the diameter of said hole in said first sheet metal panel is larger than or equal to the diameter of said spot-weld.

* * * * *